(12) United States Patent
Pandey et al.

(10) Patent No.: US 7,870,601 B2
(45) Date of Patent: Jan. 11, 2011

(54) ATTACHMENT SOLUTION FOR MULTI-ACCESS ENVIRONMENTS

(75) Inventors: Ravi Pandey, Masala (FI); Fabio Fadini, Espoo (FI); Hannu Tuominen, Kauniainen (FI)

(73) Assignee: Nokia Corporation, Espoo (FI)

( * ) Notice: Subject to any disclaimer, the term of this patent is extended or adjusted under 35 U.S.C. 154(b) by 960 days.

(21) Appl. No.: 11/702,099

(22) Filed: Feb. 5, 2007

(65) Prior Publication Data

US 2008/0120700 A1 May 22, 2008

Related U.S. Application Data

(60) Provisional application No. 60/859,292, filed on Nov. 16, 2006.

(51) Int. Cl.
G06F 7/04 (2006.01)
G06F 17/30 (2006.01)
G06F 15/16 (2006.01)
H04L 29/06 (2006.01)

(52) U.S. Cl. ............................................. 726/2; 726/8
(58) Field of Classification Search ............... 726/2, 726/8
See application file for complete search history.

(56) References Cited

U.S. PATENT DOCUMENTS

| 6,671,507 B1 | 12/2003 | Vinck | 455/411 |
| 7,089,009 B1 | 8/2006 | Fauconnier | 455/445 |
| 2004/0077335 A1 | 4/2004 | Lee et al. | 455/410 |
| 2004/0090930 A1 | 5/2004 | Lee et al. | 370/328 |
| 2004/0185899 A1* | 9/2004 | Hayem et al. | 455/552.1 |
| 2005/0079866 A1 | 4/2005 | Chen et al. | 455/435.1 |
| 2005/0113070 A1 | 5/2005 | Okabe | 455/411 |
| 2007/0150480 A1* | 6/2007 | Hwang et al. | 707/10 |
| 2008/0072301 A1* | 3/2008 | Chia et al. | 726/8 |
| 2009/0052396 A1* | 2/2009 | Bucker et al. | 370/331 |

FOREIGN PATENT DOCUMENTS

| EP | 1 746 803 A1 | 1/2007 |
| WO | WO-99/16266 A | 4/1999 |
| WO | WO 2006/116912 A1 | 9/2006 |

OTHER PUBLICATIONS

ETSI ES 282 004 v1.1.1; "Telecommunications & Internet Converged Services & Protocols for Advanced Networking (TISPAN); NGN Functional Architecture; Network Attachment Sub-System (NASS)"; Jun. 2006; pp. 1-34.
ETSI TR 182 005 v1.1.2; "Telecommunications & Internet Converged Services & Protocols for Advanced Networking (TISPAN); Organization of User Data"; Jun. 2006; pp. 1-14.
International Search Report PCT/EP2007/060775 Filed Oct. 10, 2007.

* cited by examiner

*Primary Examiner*—Shin-Hon Chen
(74) *Attorney, Agent, or Firm*—Harrington & Smith

(57) ABSTRACT

A stand-alone solution by way of a unified attachment node, an integrated solution by way of an intelligent access node, and an overall system solution by way of a unified attachment solution, which are for a multi-access network attachment. The unified attachment solution may include a unified attachment node and an intelligent access node. Stated in other words, there is provided an evolution towards a unified attachment solution for any access in a multi-access environment.

25 Claims, 12 Drawing Sheets

ATTACHMENT SOLUTION FOR MULTI-ACCESS ENVIRONMENTS

REFERENCE TO RELATED APPLICATIONS

This application claims priority of U.S. Provisional Patent Application No. 60/859,292, filed on Nov. 16, 2006, the contents of which are hereby incorporated by reference.

FIELD OF THE INVENTION

The present invention relates to an attachment solution for multi-access environments. In particular, the present invention relates to multi-access network attachment including access authentication and service authorization in convergence communication systems.

BACKGROUND OF THE INVENTION

In recent years, communication technology has widely spread in terms of number of users and amount of use of the telecommunication services by the users. This also led to an increase in the number of different technologies and technological concepts in use, which relates both to core network parts and to access network parts of communication systems.

In particular, a trend of convergence in the field of communication systems leads to convergence of mobile and fixed networks, convergence of different network concepts (e.g. second generation (2G) networks and third generation (3G) networks) as well convergence of different access technologies. This in turn leads to multi-access environments, in which a plurality of different accesses (i.e. access types, technologies and/or networks) are available. That is, several accesses are available for users (or user equipments) to get attached to a communication system (e.g. to connect to a core or service network) and to reach services or e.g. the Internet via any one of a plurality of access options available.

Network attachment generally includes two parts: access authentication and service authorization. Details about the individual parts will become apparent from the subsequent description.

A first example for a multi-access environment as currently known is based on the TISPAN (Telecommunication and Internet Converged Services and Protocols for Advanced Networking) approach by ETSI (European Telecommunications Standards Institute). The TISPAN approach provides for inter-operable and inter-domain support of mobility, roaming and multiple services in all-IP (IP: Internet Protocol) networks.

In TISPAN, a centralized element arranged in the core network part is responsible for performing address allocation, AAA functions (AAA: authentication, authorization and accounting), location (mobility) management and access network configuration. This element is usually referred to as network attachment subsystem NASS. The NASS element may also be distributed between a visited network (hereinafter referred to as access domain) and a home network (hereinafter referred to as core or service network).

The main functions and interfaces of a network attachment subsystem (NASS) element as defined in current TISPAN specifications are presented in FIG. 1 of the accompanying drawings. As can be seen in FIG. 1, a user equipment is connected to a NASS element via interface e3, and the NASS element is connected to a core network part of the communication system via interface e2. Furthermore, the NASS element is connected to a resource and admission control subsystem (RACS) via interface e4. As FIG. 1 merely serves as a general overview of TISPAN architecture with respect to a NASS element, and the individual functional blocks depicted are considered to be well-known for a person skilled in the field of mobile communications, a detailed description thereof is omitted herein. Reference is made to the list of abbreviations at the end of this specification.

The main functions of a NASS element may be summarized as follows: dynamic provision of IP (Internet Protocol) address and other user equipment configuration parameters (e.g., using dynamic host configuration protocol DHCP); user authentication, prior or during IP address allocation; user authentication based on a user network profile (for example based on point-to-point protocol PPP, hypertext markup language HTML, wireless communications according to IEEE 802.11X standards, protocol for carrying authentication for network access (PANA) of the Internet Engineering Task Force IETF), line authentication based on layer 2 (of ISO OSI reference model) line identification, location management (e.g. for emergency call, etc.), customer premises equipment (CPE) configuration, and P-CSCF (proxy call session control function) announcement.

In detail, the block level functions of a NASS element are the following. A Network Address Configuration Function (NACF) serves for IP address allocation to CPE, for distribution of other network configuration parameters such as address of DNS (domain name system) server(s), address of signalling proxies for specific protocols (e.g., P-CSCF). The NACF function is typically implemented as RADIUS (Remote Authentication Dial-In User Service) servers or DHCP (Dynamic Host Configuration Protocol) servers. An Access Management Function (AMF) serves for translating network access signalling between CPE and NACF/UAAF and for forwarding requests to the UAAF (User Access Authorization Function) to authenticate the user, authorize/deny network access and retrieve user-specific access configuration parameters. The AMF function is typically implemented as RADIUS client, if the NACF is implemented as RADIUS server. A Connectivity Session Location Repository Function (CLF) serves for registering an association between the IP configuration of the CPE and access transport characteristics, line identifier, IP edge identity, geographical location, etc. Further, it the CLF function serves for providing user network profile information to the RACS and for providing location information to TISPAN network core subsystems. The UAAF serves for performing user authentication and authorisation based on user profiles, and for collecting accounting data. A Profile Database Function (PDBF) serves for storing the user network profile containing user identity, supported authentication methods and keys. The PDBF function may be co-located with the User Profile Server Function (UPSF). A Customer Network Gateway Configuration Function (CNGCF) serves for providing a customer network gateway (CNG) with additional initial configuration information (firewall, DiffServ packet marking, etc.).

A second example for a multi-access environment as currently known is based on an approach of the Third Generation Partnership Project (3GPP). Although no element such as a NASS according to TISPAN exists in the 3GPP approach, there exist similarities, for example that there are needs to authenticate and authorize users to use different types of accesses and services. However, a common functionality for service authorization and policy and session management (such as realized by interfaces e2 and e4 of a TISPAN NASS element) is missing in the 3GPP approach.

Nevertheless, in 3GPP there are AAA servers present in the architecture, which serve for authentication and obtaining user profiles related to a certain service. Just as in the TISPAN approach, these AAA servers performing AAA functions are arranged in a core network part of an underlying communication system.

That is, in both conventional multi-access environments as set out above, there exists a centralized (i.e. core network based) authentication and mobility management functionality.

Hence, access type changes due to user mobility (i.e. roaming) are visible in the home (core) network of the user. Therefore, the home network (e.g. NASS) returns in an initial network authentication all parameters that are required (i.e. keying material, quality-of-service parameters) for network attachment for all supported access types.

When the access type changes are visible to the home network such as in known approaches, this leads to following disadvantages. First, there exists a considerable signaling delay e.g. for authentication functions. The signaling delay may prevent handovers to be seamless which is however desired in view of high user mobility. Second, the signaling load at a centralized AAA and mobility management element (e.g. NASS or AAA server) increases heavily causing expensive implementation and possibly processing overload resulting in service degradation or even outage.

In view of the above it is evident that, with current authentication methods (a plurality of which exist), an access domain/type requests a home subscriber system HSS or a home location register HLR to provide authentication vectors each time per access node. Once a user moves out of the area of the current access node, unused authentication vectors are never used.

Taking an example: A user at home uses DSL, in the morning goes to the office using 2G/3G access mobility, in office he/she uses WLAN. At the end of the day, he/she goes home using 2G/3G mobility and back home DSL network. This leads to in total four inter-access handovers (i.e. DSL->2G/3G->WLAN->2G/3G->DSL), and hence several authentications in different access domains. Each such authentication causes signaling to the core network part, being liable to delay and load restrictions.

A migration to multi-access domains in future communication systems means that even more access authentication is needed, hence more communication bandwidth would be needed when using current authentication methods and/or architectures.

Because usually not all of the access types available in a multi-access environment support a so-called "make before break mechanism", it is essential that access authentication does not suffer any unwanted delay in the procedure.

FIG. 2 shows a schematic overview of a network attachment concept. It is evident from FIG. 2 that users (or user equipments) having mobility may attach to a multi-access network vie different access types. However, for network attachment, access authentication (e.g. subscriber identity module (SIM) authentication) and service authorization are to be performed separately in dependence on the access technology used.

The first part of network attachment, i.e. access authentication, may comprise different procedures or methods. These include for example 3GPP access (2G, 3G, I-HSPA), DSLAM access (ETSI TISPAN), WLAN and WiMAX (IEEE 802.11, IEEE 802.16) and complementary access (UMA, 3GPP I-WLAN), etc. The second part of network attachment, i.e. service authorization, may comprise different procedures or methods as well. These include for example SIP services (e.g. voice-over-IP) streaming services (e.g. mobile TV), mobility services (e.g. mobile IP), other value added services (e.g. terminal configuration, virus protection, spam filter), etc.

FIG. 3 shows a schematic overview of a multi-access environment in accordance with the network attachment concept.

In dependence on the access type used (e.g. 2G/3G, UMA, WLAN, WiMAX or broadband), different access nodes are involved (e.g. BSC/RNC, UNC, AC, ASN or BRAS). In the case shown in FIG. 3, access via 2G/3G and UMA is handled by a serving GPRS (General Packet Radio Service) support node SGSN in connection with a home location register HLR. On the other hand, access via WLAN, and WiMAX is handled by an AAA (authentication, authorization and accounting) server, and access via broadband is handled by a NASS element as exemplarily described above. Service authorization is for example handled by a bootstrapping server function BSF (which is only indicated in FIG. 3).

The above-described convergence situation is also related to challenges associated with authentication. Starting from a combined access core convergence for 2G and 3G systems, the following challenges arise: plurality of access technologies (in excess of those defined in standardized solutions), authentication is tied to a particular access type, several authentication methods exist, thus causing fragmented and expensive authentication infrastructure to be implemented.

Hence, it is desirable to minimize the amount of authentication solutions and infrastructures, to provide a common authentication for multiple access types, and to develop an access authentication towards services being independent of the access type used.

Stated in other words, there is not yet provided and thus required an attachment solution for convergence networks (e.g. based on IP) and a migration of existing and new services to next generation network (NGN) concepts.

Accordingly, a solution for multi-access environments is required, which provides an attachment solution fulfilling requirements and at least mitigating existing problems, as set out above.

SUMMARY OF THE INVENTION

Hence, it is an object of the present invention for example that it may remove at least some of the above drawbacks and to provide a solution for multi-access attachment in communication systems.

According to a first aspect of the present invention, this object may be for example accomplished by a network entity and its associated devices, methods, and computer programs, which is hereinafter referred to as unified attachment node UAN. This aspect may be regarded as a standalone approach.

According to a second aspect of the present invention, this object may be for example accomplished by a network entity and its associated devices, methods, and computer programs, which is hereinafter referred to as intelligent access node IAN. This aspect may be regarded as an integrated approach.

According to a third aspect of the present invention, this object may be for example accomplished by a network entity and its associated devices, methods, and computer programs, which is hereinafter referred to as unified attachment solution UAS. The unified attachment solution of the third aspect may comprise at least one unified attachment node UAN according to the first aspect and at least one intelligent access node IAN according to the second aspect. This aspect may be regarded as an overall system approach.

Details about the first to third aspects and their conceptual as well as structural implementations are set out in the following.

Stated in more general terms, embodiments of the present invention provide a simple, flexible and fast solution meeting different requirements as set out above and below.

According to an embodiment of the present invention, there is provided SGSN-based solution and SIM-based authentication for any access.

By virtue of aspects and embodiments of the present invention, as explained above and below, at least one of the following effects can be achieved.

The functionality of network attachment in the network is split so that access authentication may be done autonomously close to access network for optimum performance. Service authorization may be supported from a centralized location, close to register and application servers with a link to an access node, e.g. IAN. for obtaining access specific information.

The solution according to embodiments of the present invention may be accomplished without caring about access type or access technology used. Namely, users are allowed to do whatever and wherever without caring about access type or access technology.

The solution according to embodiments of the present invention may include a communication channel between UAN and IAN entities. Any service may ask/request access related information from UAN (e.g. location of a user, access technology used) in which case UAN obtains this information from IAN.

The request described above may be asked at any time during service usage, or UAN may be asked to provide information about changed access conditions, including but not limited to congestion of the access network, change of location or access type.

Generally, a simplification of known AAA architectures may be achieved. A single authentication point for multiple access types may be achieved. An easy service authorization based on a shared key principle may be achieved. A single point for user identification (e.g. in the form of a dynamic database) may be achieved According to an embodiment of the present invention, there is provided a unified attachment solution providing a unified solution for multiple authentication methods. This is particularly beneficial in view of and overcoming the problems of complexity of convergence of different accesses, user authentication in different access domains, mobility in heterogeneous access and service authorization.

A unified solution according to embodiments of the present invention may be integrally configured for mobility, authentication, convergence (i.e. simplicity) and services (i.e. new opportunities).

Having and using a common access authentication point according to embodiments of the present invention may lead for example to the following benefits: less integration work, capacity planning becomes easier and less network elements to be operated.

Having and using a common access and service authorization according to embodiments of the present invention may lead for example to the following benefits: single sign-on, location awareness in service offering, access type awareness and quality-of-service (QoS) control in service offering.

A unified attachment solution according to present embodiments may allow users/subscribers from different access networks to connect to the operator's network and get access to services and e.g. the Internet. It provides registration at access level and initialisation of the user equipment for accessing services, for convergence networks (mobile and fixed environment). Service authorization may be provided according to 3GPP GAA architecture. In general, it may be understood as, but is not limited to, a solution at control layer to attach a user to a network and covering both access and service authorization.

The present embodiments may support multiple authentication protocols, both for the interface with the user equipment (for example PPP, 802.1X, PANA, DHCP) and for the interconnection with the other NGN entities (for example RADIUS, DIAMETER).

The solution presented in this document is designed to support integration of authentication and authorization between different access networks and may be used for one or another access technology (e.g. xDSL, Public WiFi, 3GPP PS, WiMAX, WLAN) in both next-generation and today architectures.

Thereby, harmonization of authentication is enabled, which may be seen as a very important step towards convergence.

In particular, an overall system approach may provide the following beneficial effects: an optimized solution for networks with a high number of transactions or geographical distribution requirements, a complement of a single point of authentication and authorization of a register solution, provision of a common dynamic database for fixed and wireless accesses, support of PSTN simulation, and enablement of multimedia services on multiple accesses.

From an economical point of view, embodiments of the present invention are adapted to the market trend of diverse access technologies and converged services across different accesses. This includes for example that convergence is a strategy evolution for all service providers and operators, that mobile and fixed mobile networks are adopting IMS (IP multimedia subsystem) architecture design for NGN, and that migration to NGN for legacy PSTN (public switched telephone network) and new multimedia services is happening through PSTN simulation (IMS and TISPAN).

From an operator point of view, embodiments of the present invention are adapted for fulfilling the need of remaining successful by providing easy-to-use services in multi-access environments. This includes for example that mobility is an essential part of service experience, that SIM authentication provides easy and secure access to networks, and that service authorization without user interaction is a business catalyst. Moreover, a presented convergence attachment solution is able to serve PSTN simulation, broadband access and wireless access, to support easy migration to future converged environments in terms of a simplified network architecture and an easy service deployment, to sustain modularity and an open architecture, and to be built on top of existing network products.

Moreover, network optimization and simplicity may be achieved by embodiments of the present invention, thus realizing an important step toward convergence. This includes for example at least one of a common authentication infrastructure for multiple access technologies, a register architecture where different applications (e.g. HLR, HSS, AAA etc) share a common subscriber database, and an easy service development despite of the several access technologies in use.

BRIEF DESCRIPTION OF THE DRAWINGS

The present invention is described herein below with reference to the drawings.

DETAILED DESCRIPTION OF THE DRAWINGS

Figure 1:
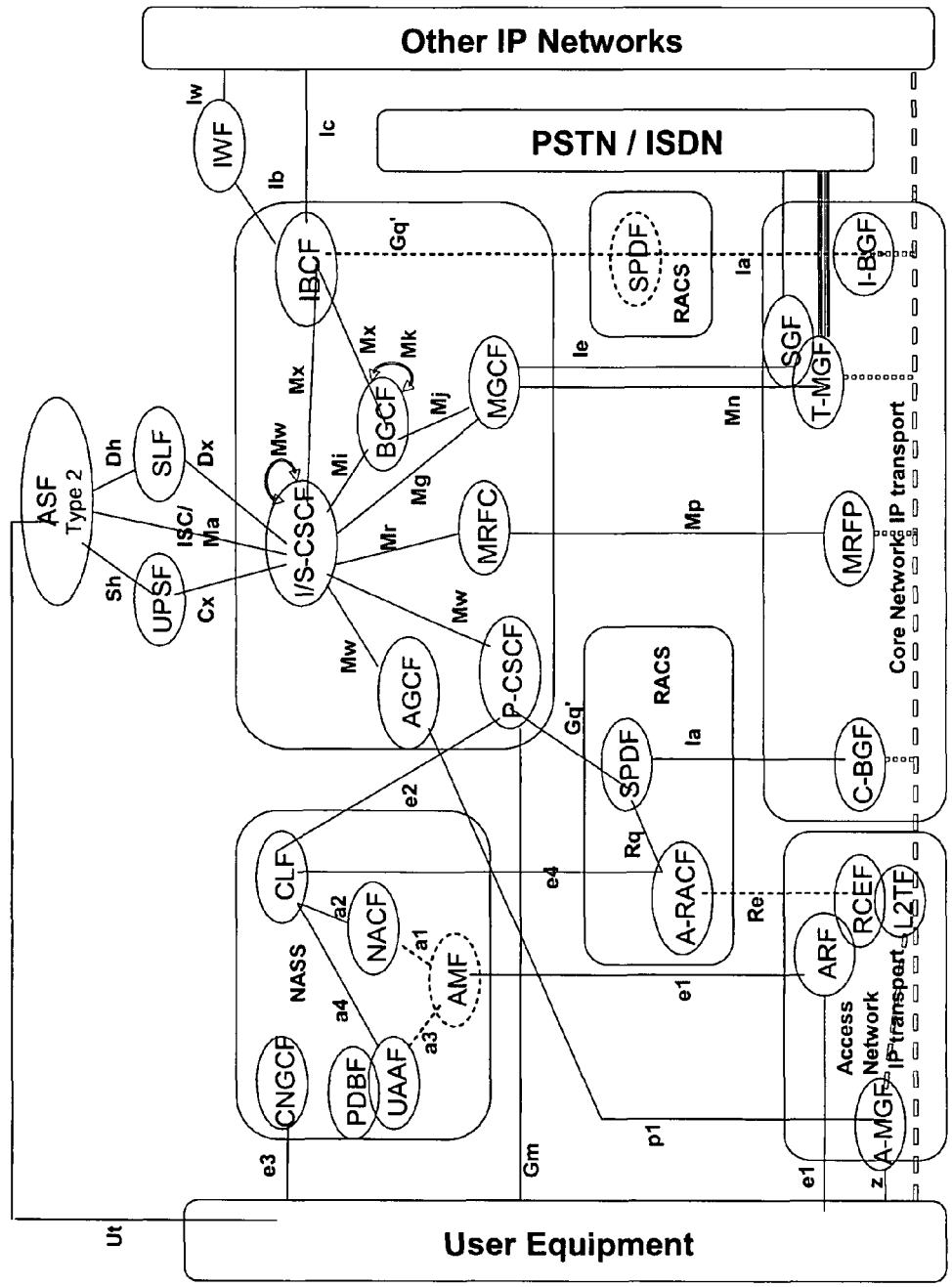
FIG. 1 shows a schematic overview of functions and interfaces of a network attachment subsystem (NASS) element as defined in current TISPAN specifications.
Figure 2:
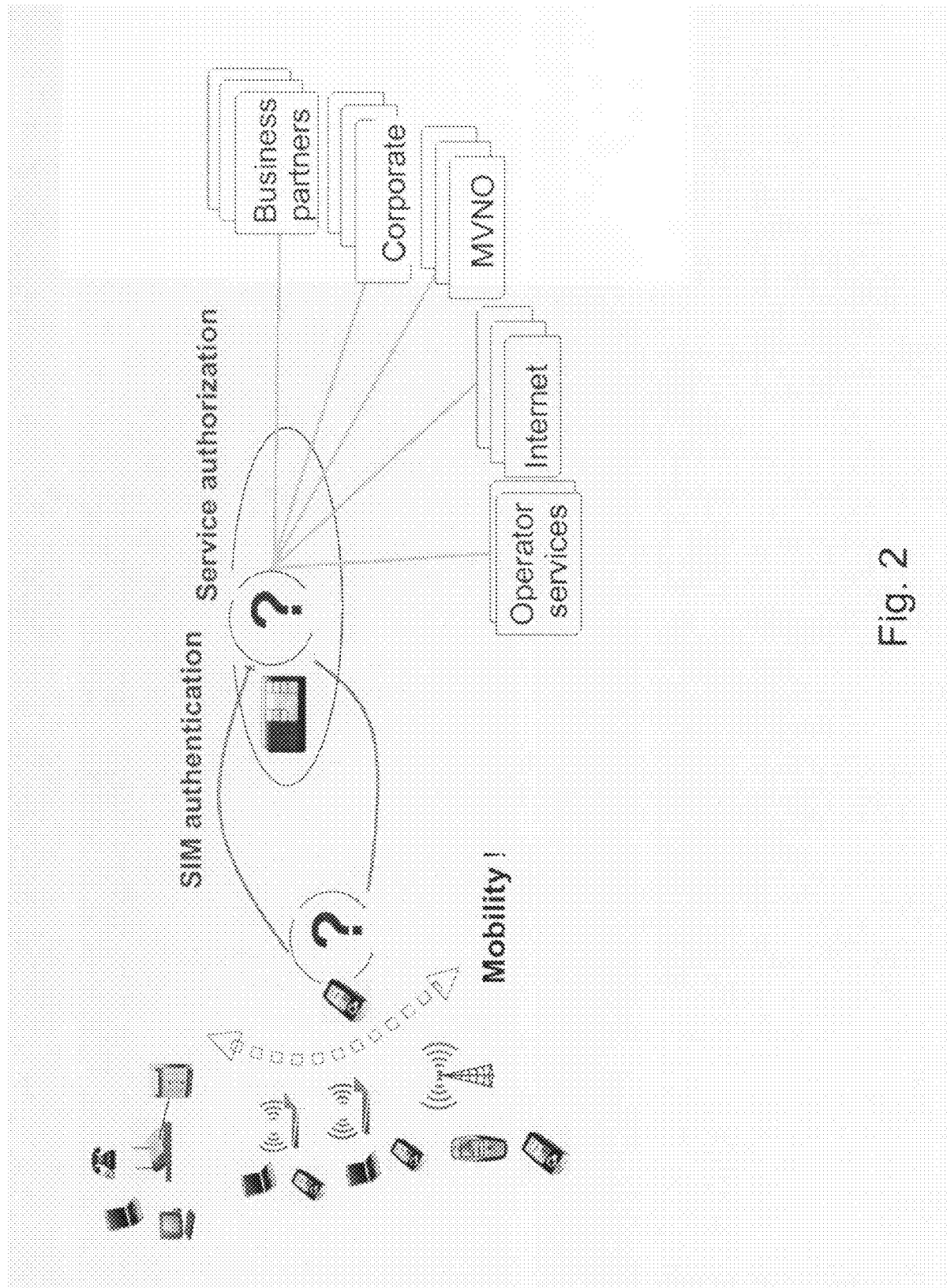
FIG. 2 shows a schematic overview of a network attachment concept.

The present invention and exemplary embodiments thereof are described herein below with reference to the drawings representing particular non-limiting examples. A person skilled in the art will appreciate that the invention is not limited to these examples, and may be more broadly applied.

In particular, the present invention and its embodiments are described in relation to TISPAN and/or 3GPP examples. As such, the description of embodiments given herein specifically refers to terminology which is directly related to TISPAN and/or 3GPP. Such terminology is only used in the context of the presented examples, and does not limit the invention in any way. Rather, the present invention and its embodiments are likewise applicable both to TISPAN and 3GPP systems as well as to any other architecture of a multi-access environment. Furthermore, irrespective of specific examples given herein below, the present invention and its embodiments are applicable to any conceivable access type or technology, in particular those access types and technologies requiring authentication and authorization functionality.

For the purpose of the present specification, the following acronyms are used in the meaning identified below. Namely, AAA stands for Authentication, Authorisation and Accounting, AC stands for Access Controller, AGCF stands for Access Gateway Control Function, AMF stands for Access Management Function, A-RACF stands for Access Resource Admission Control Function, ASN stands for Access Service Network, BGCF stands for Breakout Gateway Control Function, BRAS stands for Broadband Remote Access Server, BSC stands for Base Station Combiner/Controller, BSF stands for Bootstrapping Server Function, C-BGF stands for Core Border Gateway Function, CLF stands for Connectivity Session Location Repository Function, CNGCF stands for Customer Network Gateway Configuration Function, eNASS stands for extended Network Attachment Subsystem, HLR stands for Home Location Register, HSS stands for Home Subscriber System, I/S-CSCF stands for Interrogating/Serving Call State Control Function, IBCF stands for Interconnection Border Control Function, IMR stands for IP Multimedia Register, IWF stands for Inter-working Function, L2TF stands for Layer 2 Terminal Function, MGCF stands for Media Gateway Control Function, MRFC stands for Multimedia Resource Function Controller, MRFP stands for Multimedia Resource Function Processor, MSS stands for MSC Server, NACF stands for Network Address Authentication Function, NASS stands for Network Attachment Subsystem, NSR stands for Nokia Subscriber Data Repository, P-CSCF stands for Proxy Call Session Control Function, PDBF stands for Profile Database Function, RACF stands for Resource and Admission Control Subsystem, RACS stands for Resource Admission Control Subsystem, RCEF stands for Resource Control Enforcement Function, RNC stands for Radio Network Controller, SGF stands for Signalling Gateway Function, SGSN stands for Serving GPRS Support Node, SLF stands for Subscription Locator Function, SPDF stands for Service Policy Decision Function, T-MGF stands for Trunking Media Gateway Function, UAAF stands for User Access Authorization Function, UAS stands for Unified Attachment Solution, UNC stands for UMA Network Controller, and UPSF stands for User Profile Server Function.

Figure 4:
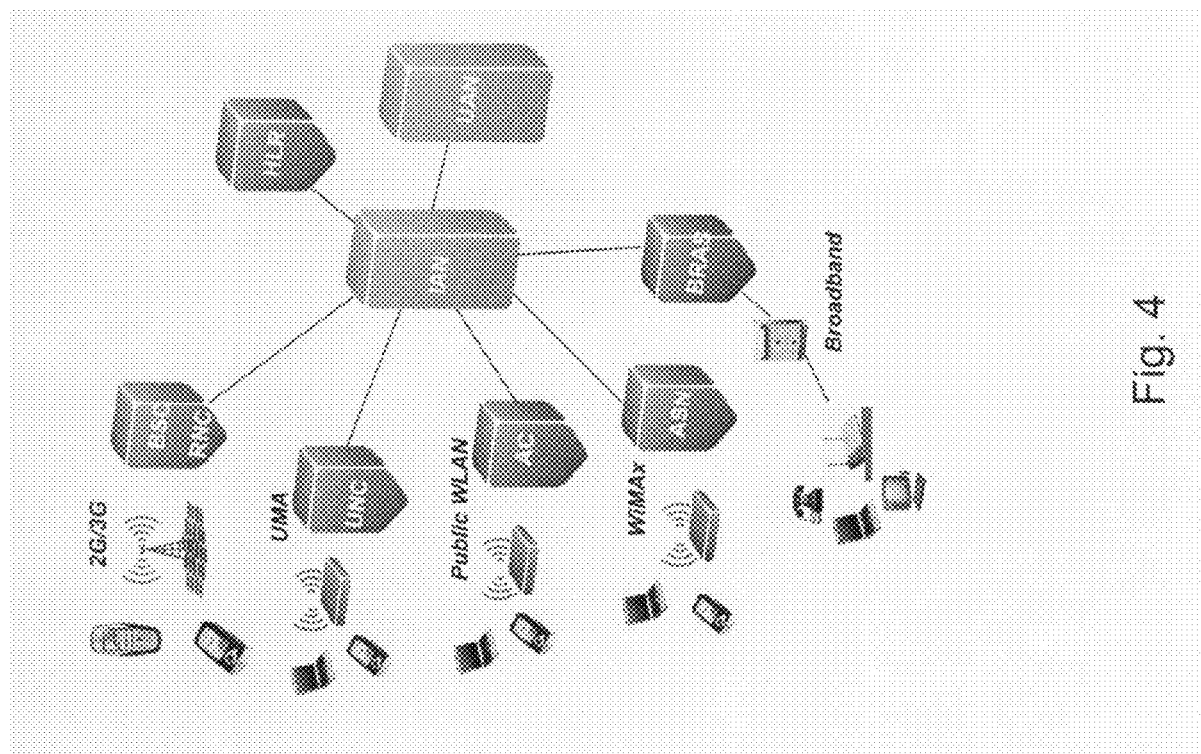
FIG. 4 shows a schematic overview of a multi-access environment in accordance with a network attachment concept according to an embodiment of the present invention.

FIG. 4 shows a schematic overview of a multi-access environment in accordance with a network attachment concept according to an embodiment of the present invention.

Figure 3:
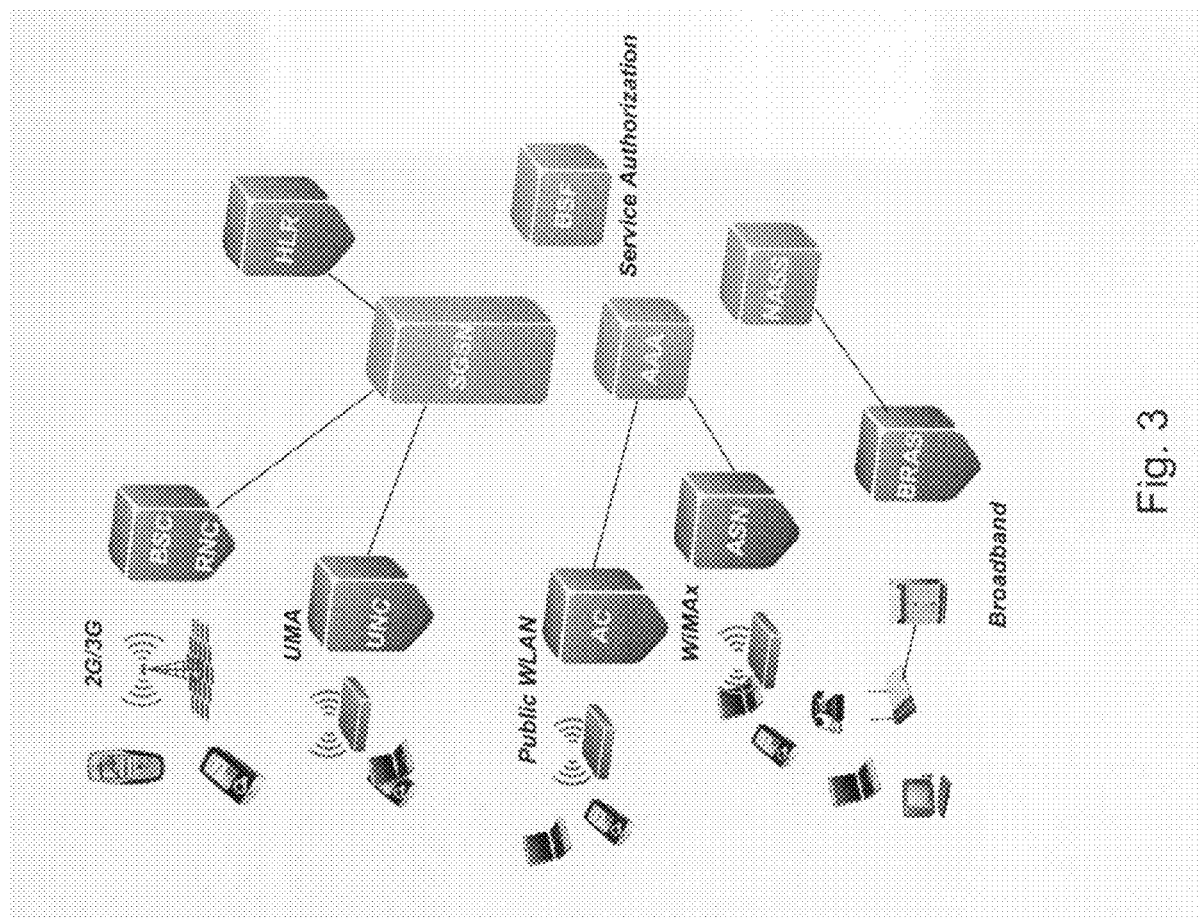
FIG. 3 shows a schematic overview of a multi-access environment in accordance with the network attachment concept.

In contrast to a network attachment concept as shown e.g. in FIG. 3, access via different access types or technologies is handled by the same network entity or entities. That is, independent of the access type used (e.g. 2G/3G, UMA, WLAN, WiMAX or broadband) and thus independent of the access nodes involved (e.g. BSC/RNC, UNC, AC, ASN or BRAS), network attachment is handled by a network entity denoted as intelligent attachment node IAN and/or an entity denoted as unified attachment node UAN, which are inter-connected. Furthermore, the IAN entity is connected to a register such as e.g. a home location register HLR (as shown) or a home subscriber system HSS (not shown).

Thus, a unified attachment solution is provided by way of the concept as shown in FIG. 4. Although not explicitly shown in FIG. 4, it is noted that the depicted embodiment comprises at least one of the following features: re-use of SIM (subscriber identity module) as basis for different authentication methods, re-use of access authentication for service authorization, enablement of authentication by third party services, and support for IEEE 802.11X (i.e. for EAP-SIM, EAP-AKA, example) as desirable by operators.

A unified attachment node UAN according to an embodiment of the present invention comprises for example at least one of the following features: multiple access authentication (WiFi, WiMAX, etc.), AAA and/or DHCP server, a NASS function according to TISPAN, service authorization in 3GPP GAA (generic bootstrapping architecture) e.g. for mobile TV support (e.g. MBMS, DVBH), i.e. realizing BSF (bootstrapping server function) functionality, and a mobility management entity (MME) function according to 3.9G standards.

An intelligent access node IAN according to an embodiment of the present invention comprises for example at least one of the following features: evolution of SGSN functionality, multiple access authentication (WiFi, WiMAX, etc.), combining UAN and SGSN functionality in a single entity, and offering an integrated solution approach.

The above-described entities UAN and IAN are, although depicted in FIG. 4 in interrelation, principally independent of each other, thus being capable of being implemented as standalone or integrated approach.

Figure 5:
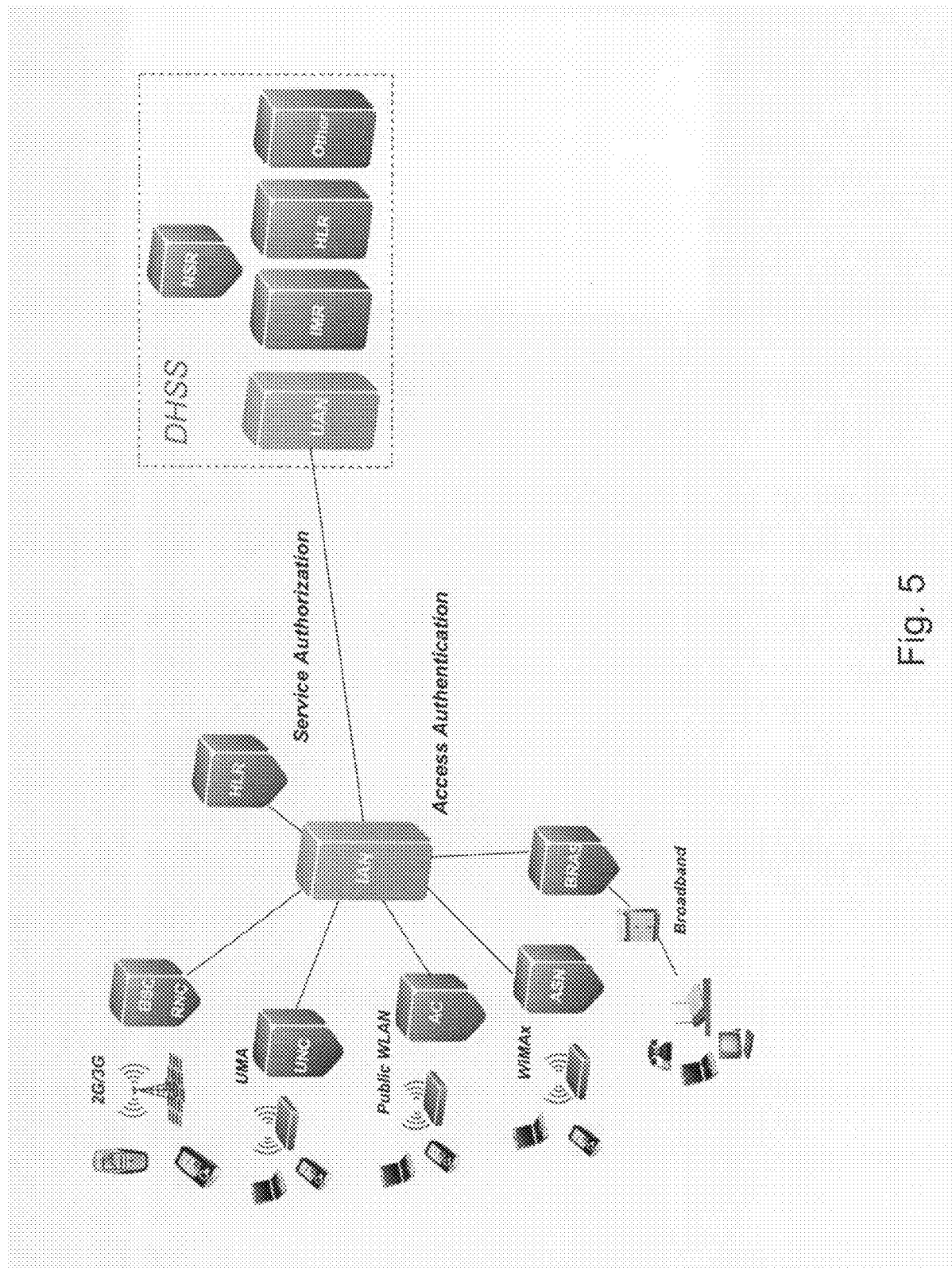
FIG. 5 shows another schematic overview of a multi-access environment in accordance with a network attachment concept according to an embodiment of the present invention, wherein a service authorization side is depicted in more detail.

FIG. 5 shows another schematic overview of a multi-access environment in accordance with a network attachment concept according to an embodiment of the present invention, wherein a service authorization side is depicted in more detail.

As compared with the illustration of FIG. 4, the illustration of FIG. 5 is equivalent as regards an access authentication side (which is depicted on the left hand side of the figure). That is, just as according to FIG. 4, the network attachment system shown in FIG. 5 provides access authentication close to an access domain, thus reducing signaling, achieving a faster authentication and handover, accomplishing an efficient IP address allocation, and enabling lawful interception. According to the illustration of FIG. 5, it further becomes apparent that a service authorization side according to the present embodiment, which is depicted on the right hand side of the figure), is based on BSF/GAA functionality, and/or NASS/TISPAN functionality.

According to the present embodiment, the service authorization side of the system comprises a dynamic home subscriber system DHSS. The present DHSS entity comprises for example (according to FIG. 5) a unified attachment node UAN according to an embodiment of the present invention, as well as IMR, HLR, NSR and other functionalities. For more details, reference is made to FIG. 6.

On the other hand, for service users the access authentication itself may not be crucial. Services can benefit from some access specific information, such as location, access type and possible congestion status in the network. Thus, it can be seen that service authorization comprises a functionality that has strict real time requirements (access authentication) and non real time requirements such as characteristics of a particular access network (see below). Accordingly, a basic principle of embodiments of the present invention resides in that an optimized network attachment solution consists of an independent autonomous node close to a user, that can perform authentication, and a service authorization node, which can deliver access specific information for that service, and a communication link between them.

By virtue of the embodiment shown in FIG. 5, authentication, mobility and register harmonization is provided.

Figure 6:
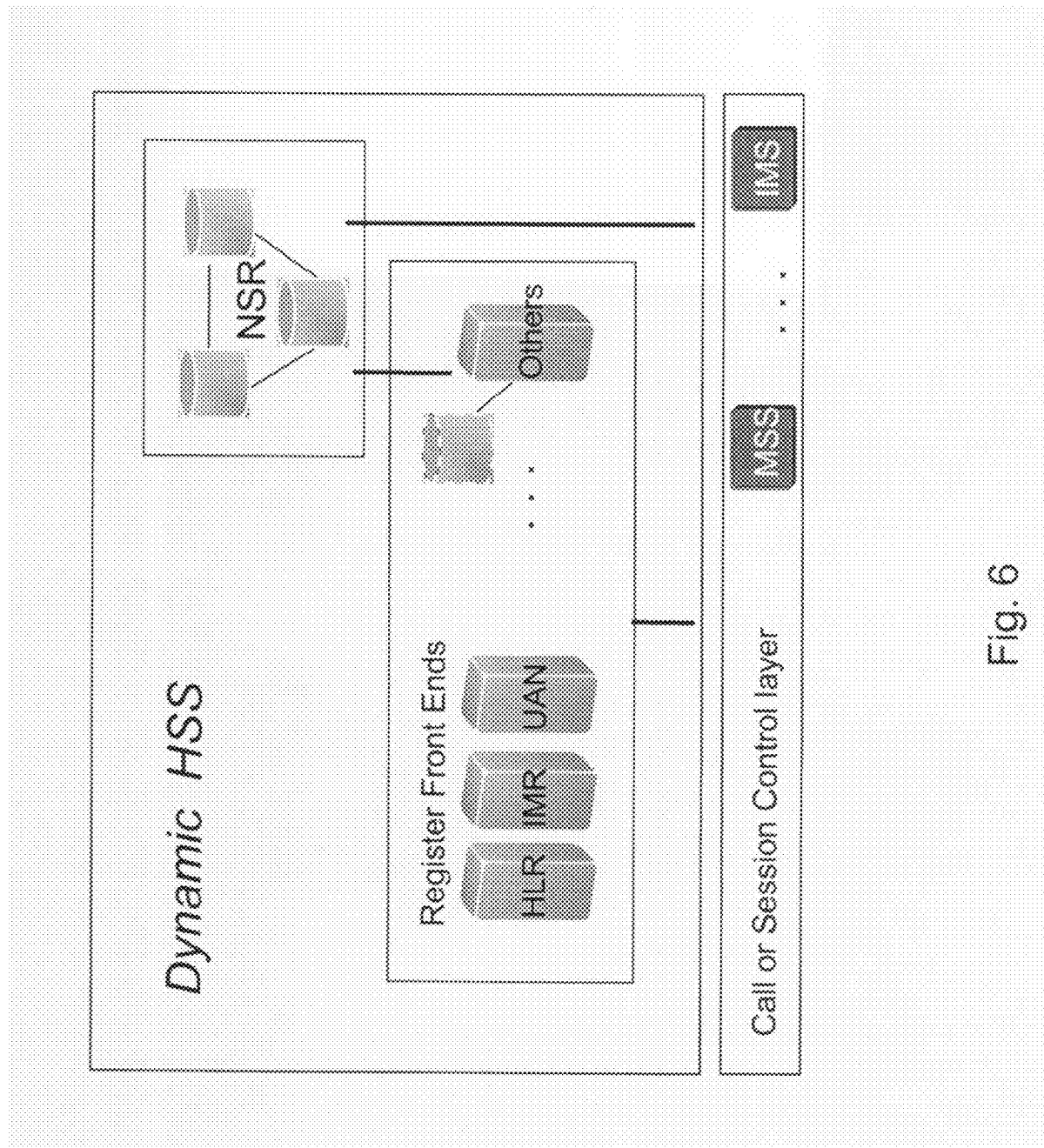
FIG. 6 shows a schematic block diagram of a dynamic home subscriber system entity according to an embodiment of the present invention.

FIG. 6 shows a schematic block diagram of a dynamic home subscriber system entity according to an embodiment of the present invention.

According to FIG. 6, a dynamic home subscriber system entity according to an embodiment of the present invention comprises a call or session control layer including for example MSS, IMS, etc. functions, register front ends including for example HLR, IMR, UAN, etc. functions, and a subscriber data repository function (such as a proprietary Nokia Subscriber Data Repository NSR function as illustrated in FIG. 6). Both the register front ends and the NSR function are connected to the call or session control layer, and are interconnected.

The DHSS according to FIG. 6 may be considered as a single point of contact, a single point of management and a single point of authentication, thus realizing a UAN and register harmonization according to an embodiment of the present invention. The DHSS may be understood as an "umbrella" covering all or at least most of register features. The UAN of the DHSS may complement the single point of authentication/authorization of the present register solution. Further, the UAN may provide a common dynamic database for fixed and wireless accesses, and may cover increasing demands of new and existing concepts needed in fixed and wireless access.

Figure 7:
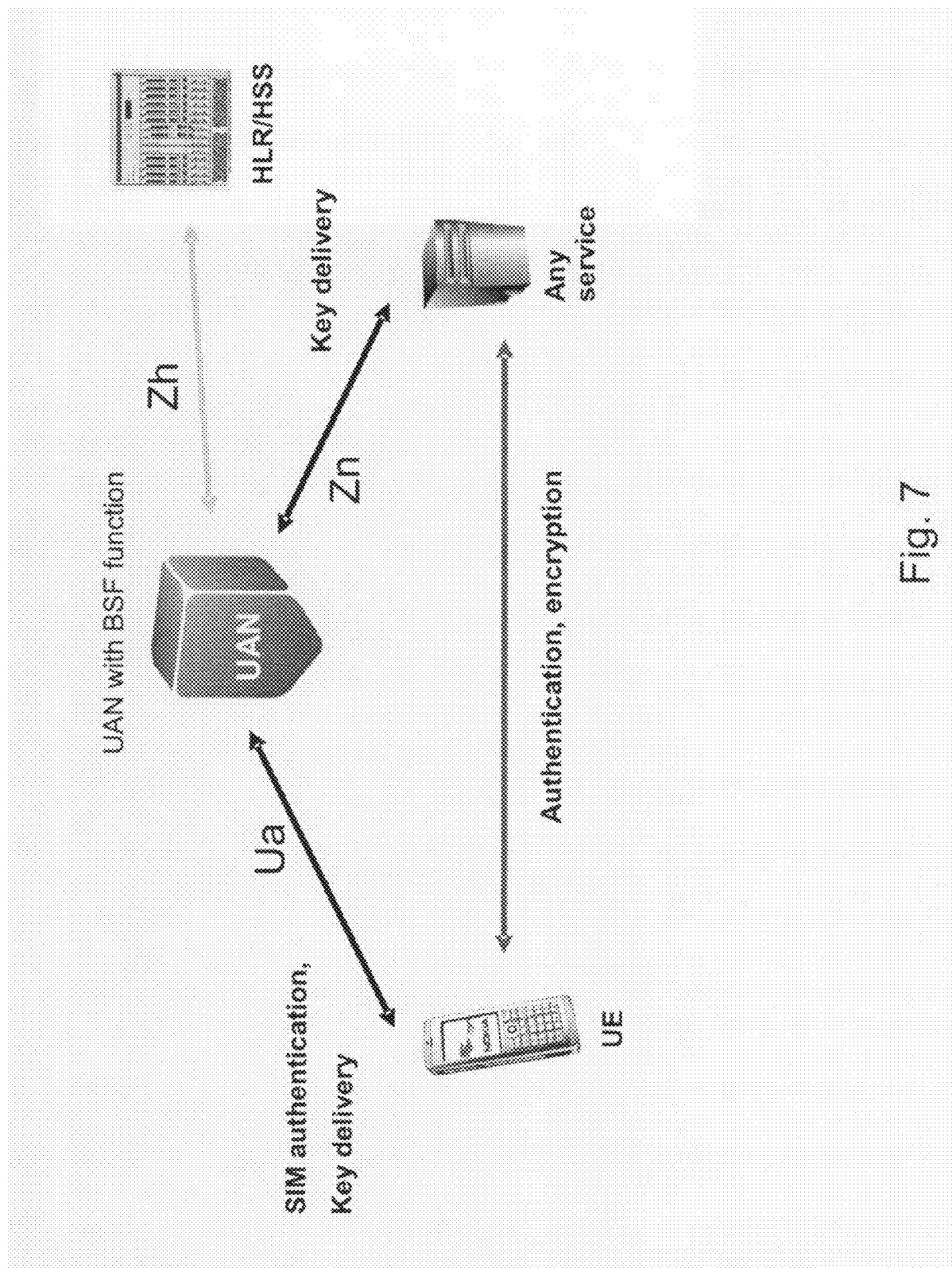
FIG. 7 shows a conceptual overview of a unified attachment node according to an embodiment of the present invention within a framework of generic authentication.

FIG. 7 shows a conceptual overview of a unified attachment node according to an embodiment of the present invention within a framework of generic authentication.

As illustrated in FIG. 7, a user or user equipment UE is connected to a UAN entity via an interface exemplarily specified as Ua interface, the UAN is connected to any service via an interface exemplarily specified as Zn interface, and the UAN is further connected to a HLR/HSS register via an interface exemplarily specified as Zh interface.

According to an embodiment of the present invention, a unified attachment node UAN as described above may implement a bootstrapping server function BSF within a framework of a generic authentication architecture GAA. Thereby, service authorization is complemented in a beneficial manner.

Basically, as may be seen from FIG. 7, a GAA infrastructure authenticates a user UE based on SIM and provides keys which can be used e.g. to authenticate UE to a service and to encrypt traffic over any access. A UAN entity can provide access specific information as part of key validation process over the specified Zn interface.

Figure 8:
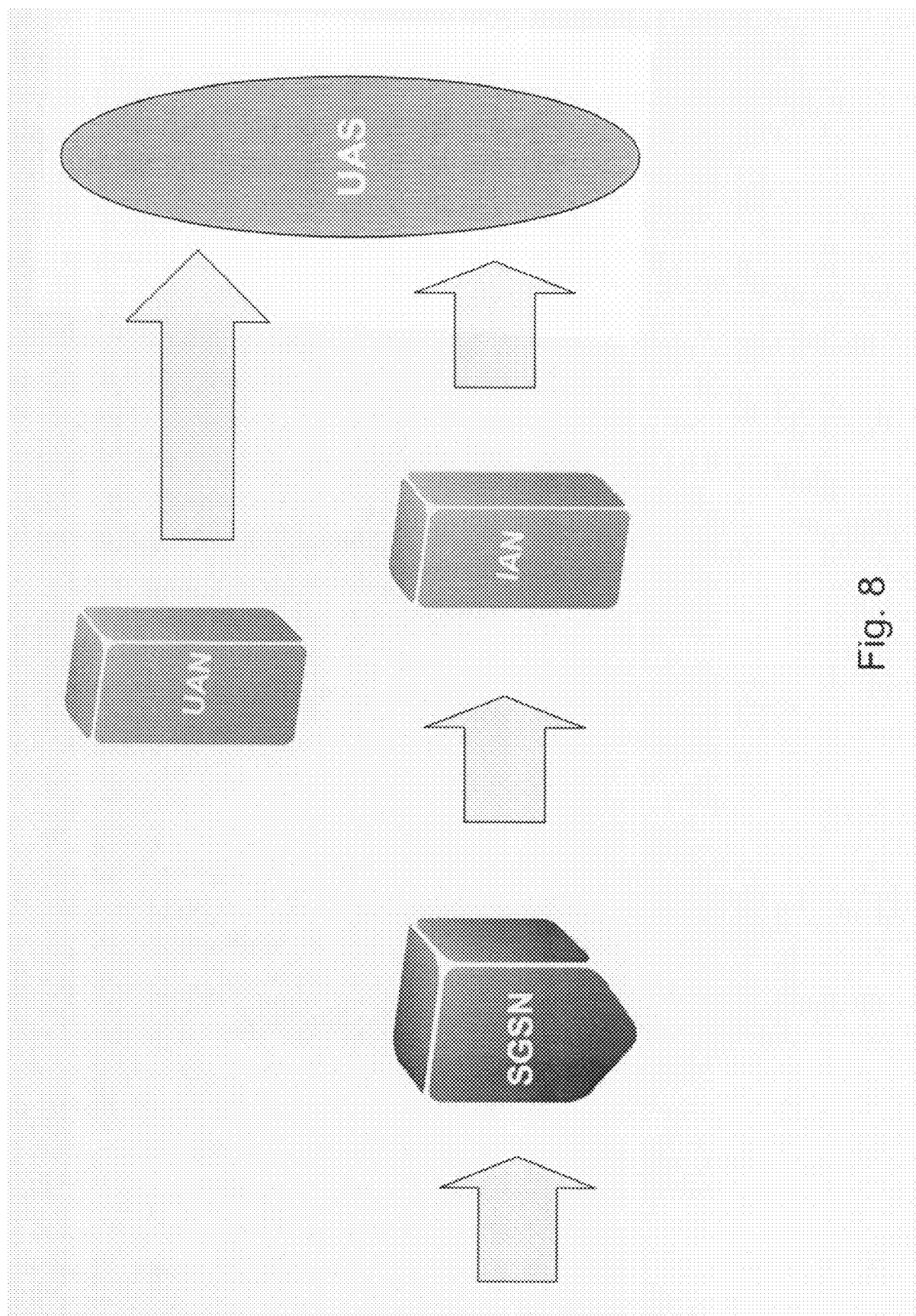
FIG. 8 shows a high-level diagram of SGSN evolution towards a unified attachment solution according to an embodiment of the present invention.

FIG. 8 shows a high-level diagram of SGSN evolution towards a unified attachment solution according to an embodiment of the present invention.

From FIG. 8, it is evident that a unified attachment solution UAS according to the present embodiment logically evolves from an SGSN entity. The SGSN building the starting point is evolved into an intelligent attachment node IAN as described above. A combination of the IAN and a unified attachment node UAN as described above, constitutes a unified attachment solution UAS according to the present embodiment.

Accordingly, a UAS entity according to the present embodiment may be implemented on top of an existing support node entity such as for example a serving GPRS support node entity.

Figure 9:
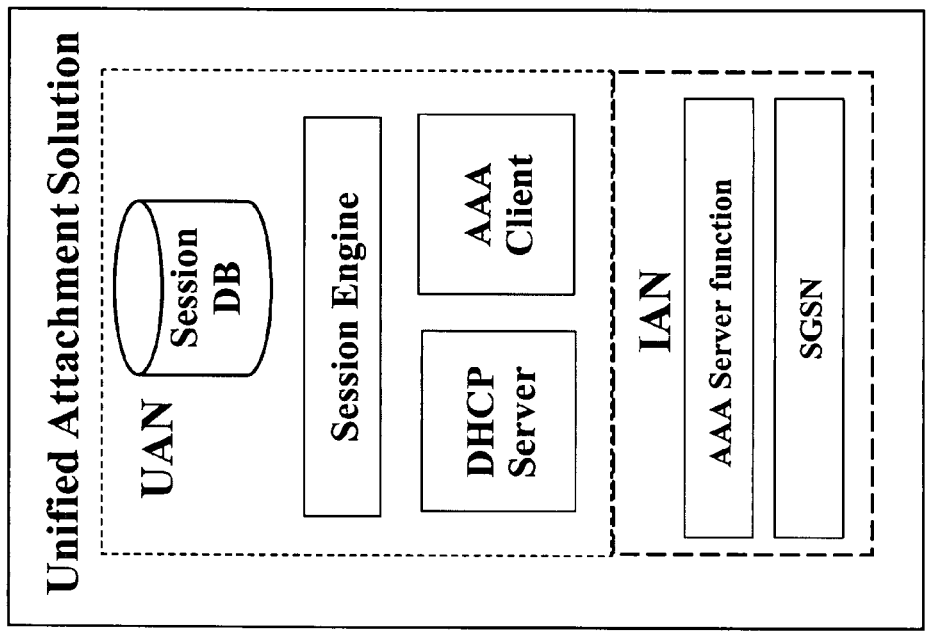
FIG. 9 shows a schematic block diagram of a unified attachment solution according to an embodiment of the present invention.

FIG. 9 shows a schematic block diagram of a unified attachment solution according to an embodiment of the present invention.

In FIG. 9, the present UAS entity is depicted in more detail. It becomes apparent that a UAS entity according to one embodiment of the present invention comprises two functional blocks, i.e. a UAN section and an IAN section. The description of the individual sections according to the above applies here as well. The functionalities may be divided in such a way that the UAS offers distributed functionality between a visited and a home (core) network that allows nomadicity (i.e. mobility) and roaming of users or user equipments.

According to an embodiment, the UAN section (acting as a NASS function) may comprise at least one of a session engine with a related session database (e.g. for obtaining access-specific information from the IAN, when so requested by service authorization), a dynamic configuration server such as a DHCP server (e.g. for centralized IP address management) and an authentication and authorization client such as an AAA client (e.g. for communication between UAN and IAN). According to an embodiment, the IAN section comprises at least one of an authentication and authorization server such as an AAA server function and an SGSN functionality.

A unified attachment solution UAS according to an embodiment of the present invention comprises for example at least one of the following features: multiple access authentication (WiFi, WiMAX, etc.), AAA and/or DHCP server, a NASS function according to TISPAN, service authorization in 3GPP GAA (generic bootstrapping architecture) e.g. for mobile TV support (e.g. MBMS, DVBH), i.e. realizing BSF (bootstrapping server function) functionality, and a mobility management entity (MME) function according to 3.9G standards.

Accordingly, an embodiment of a network attachment solution may be created by introducing a node called IAN which performs access authentication for any access technology and a node called UAN which collects access specific information and performs service authorization, and an interface for application servers to obtain information of user location and access type.

According to an embodiment of the present invention, a unified attachment solution UAS may comprise at least one of the following external interfaces:

at least one external interface (using RADIUS and/or DHCP protocols) with the UE in the access network for authentication, authorization and configuration;

at least one external interface (e3 interface in TISPAN standards, possibly using HTTP and/or TFTP protocols) with the CNG (customer network gateway) in customer premises. This interface may be used for initialisation and remote configuration of the CNG;

at least one external interface (compliant with e4 DIAMETER specifications in the TISPAN standards) with the TISPAN Resource Admission Control Subsystem (RACS) for transferring user network profile and network location information;

at least one external interface (compliant with e2 DIAMETER specifications in the TISPAN standards) with the TISPAN service control subsystems and applications plane which permit a UAN to provide them with information about the user location; and an external interface or a set of external interfaces (based on standard protocols like e.g. HTTP, SSH, SFTP) with the operator's information system, customer care and supervision network.

Thus, a unified attachment solution is provided by way of the concept as shown in FIG. 9. Although not explicitly shown in FIG. 4, it is noted that the depicted embodiment comprises at least one of the following features: a set of different authentication methods including for example EAP-SIM, EAP-AKA, certificate-based, user name-password, device authentication, a re-use of keying material and user profile information for fast inter-system handovers, a support for a communication link between IAN and UAN, an enablement of authorization of services, and a communication between IAN and UAN elements inside UAS.

Figure 10:
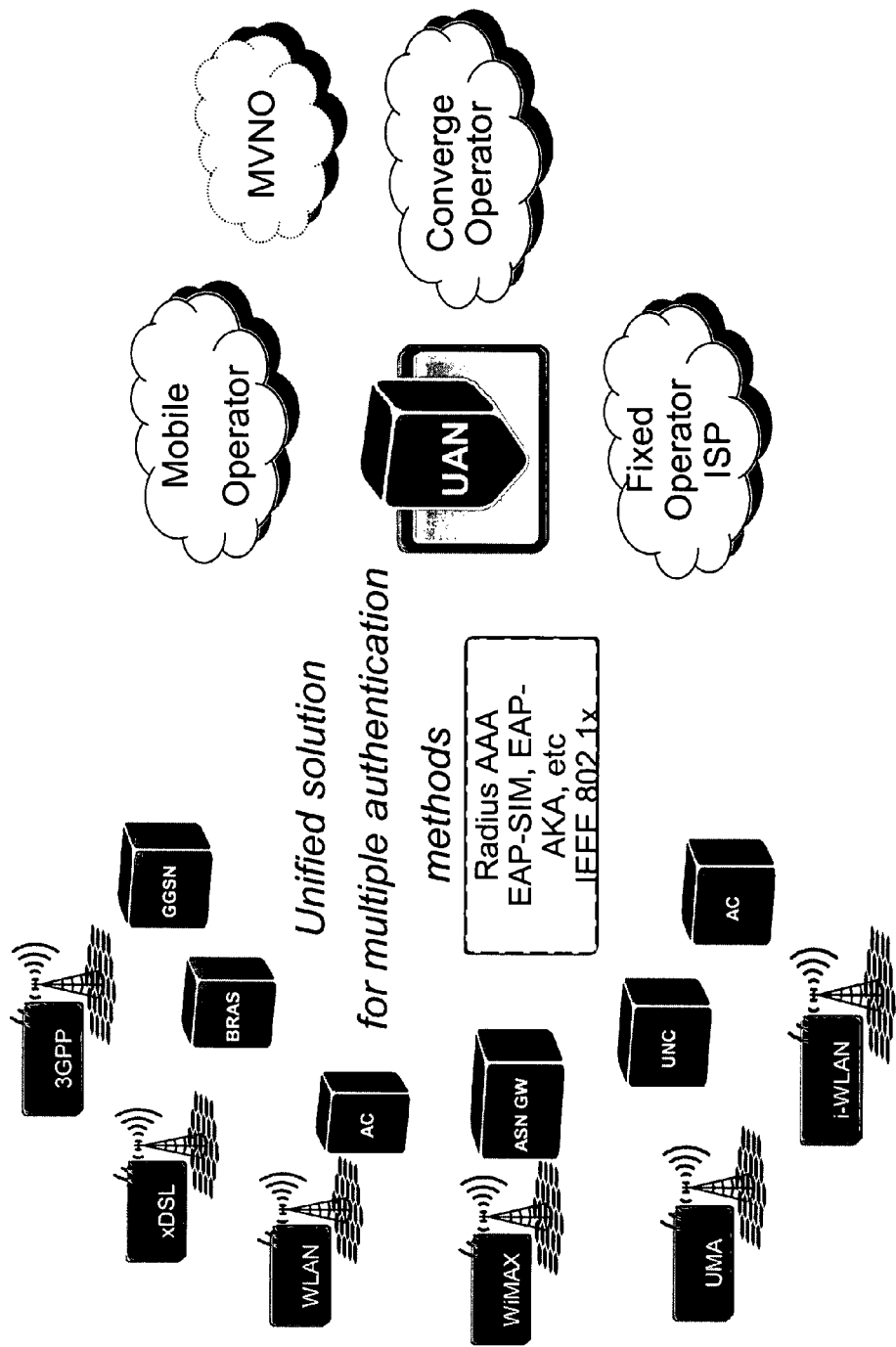
FIGS. 10 to 12 show an exemplary but non-limiting variety of additional implementation details of embodiments of the present invention.
Figure 11:
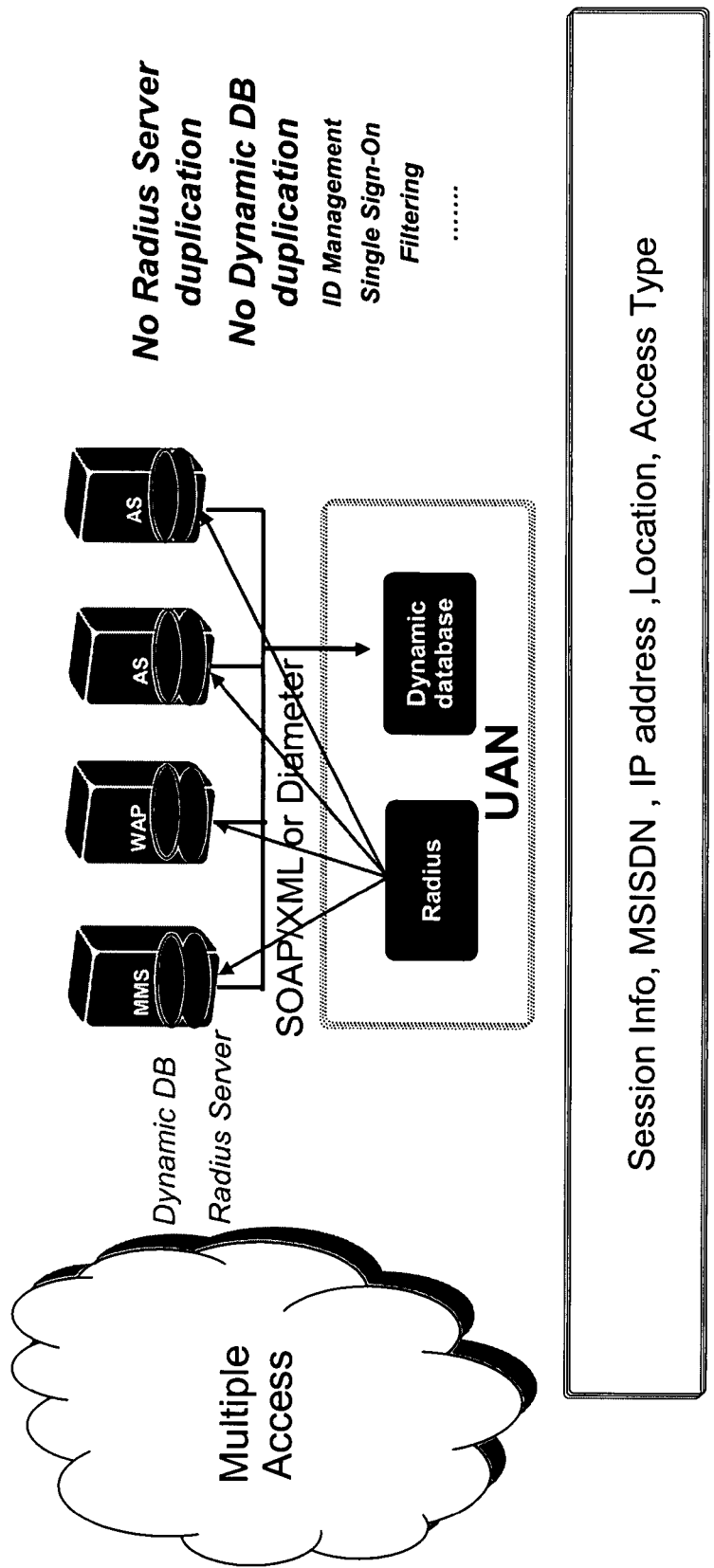
Figure 12:
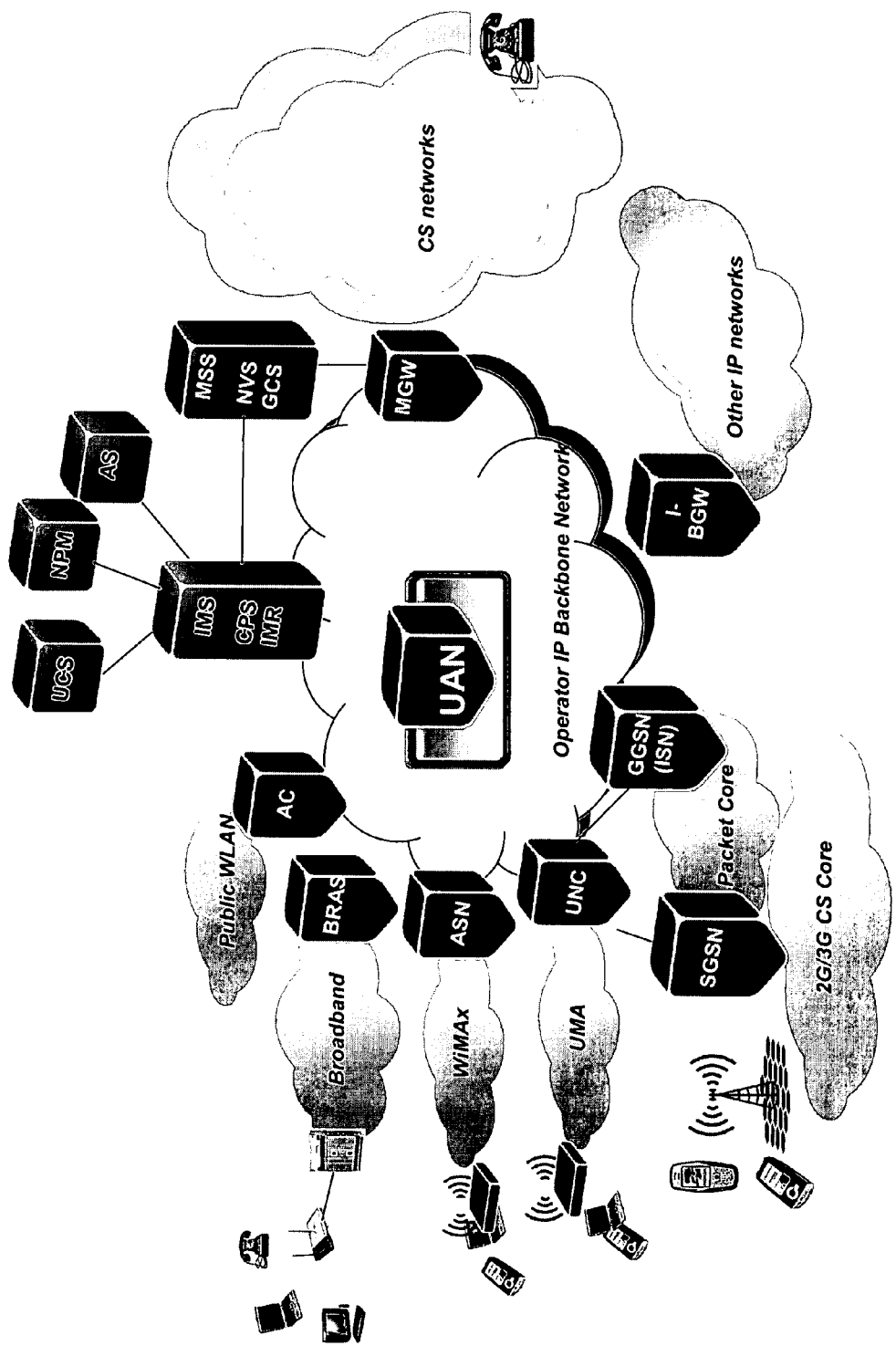

FIGS. 10 to 12 show an exemplary but non-limiting variety of additional implementation details of embodiments of the present invention.

According to FIG. 10, a minimized authentication infrastructure and faster service deployment capabilities are indicated.

According to FIG. 11, a simplified RADIUS architecture and faster service deployment capabilities are indicated.

According to FIG. 12, an optimized network architecture and faster service creation capabilities are indicated.

Although described above with respect to certain terms such as network attachment subsystem (NASS) or unified attachment solution (UAS), the present invention is not limited to devices and/or systems with this denomination. Rather, these terms merely serve for illustrative purpose. The present invention and all its aspects and options may as well be applied to any other network element providing similar or equivalent functions, regardless of its name.

Although the aspects of the present invention are described above mainly with respect to devices, elements and systems from a structural point of view, the present invention as a matter of course also covers respective methods and operations performed by these devices, elements and systems. Such methods and operations may of course be implemented by way of software and/or hardware.

It is to be noted that any one of the apparatuses and system of embodiments according to the present invention are configured to be operated in association with access according to at least one of 3GPP, WLAN, DSL, Bluetooth®, WiMAX, WiFi, or any other access in accordance with IEEE 802.11X.

It is to be noted that any one of the apparatuses and system of embodiments according to the present invention are configured for authentication according to an extensible authentication protocol method for GSM subscriber identity and/or an extensible authentication protocol method for UMTS authentication and key agreement and/or RADIUS and/or DIAMETER.

In general, it is to be noted that respective functional elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Furthermore, method steps and functions likely to be implemented as software code portions and being run using a processor at one of the entities are software code independent and can be specified using any known or future developed programming language such as e.g. Java, C++, C, and Assembler. Method steps and/or devices or means likely to be implemented as hardware components at one of the peer entities are hardware independent and can be implemented using any known or future developed hardware technology or any hybrids of these, such as MOS, CMOS, BiCMOS, ECL, TTL, etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

Generally, for the purpose of the present invention as described herein above, it should be noted that a communication device or terminal may for example be any device by means of which a user may access a network and/or a server of such network; this implies mobile as well as non-mobile devices and networks, independent of the technology platform on which they are based; only as an example, it is noted that terminals operated according to principles standardized by the 3$^{rd}$ Generation Partnership Project 3GPP and known for example as UMTS terminals (Universal Mobile Telecommunication System) are particularly suitable for being used in connection with the present invention, nevertheless terminals conforming to standards such as GSM (Global System for Mobile communications) or IS-95 (Interim Standard 95) may also be suitable;

networks referred to in this connection may comprise mobile and fixed network sections independent of the type of technology on which the networks are operated, for example those networks operate on the basis of the Internet Protocol IP, independent of the protocol version (IPv4 or IPv6), or on the basis of any other packet protocol such as User Datagram Protocol UDP, etc.

devices can be implemented as individual devices, devices may also be implemented as a module configured to accomplish interoperability with other modules constituting an entire apparatus, e.g. a module device may be represented as a chipset or chip card e.g. insertable and/or connectable to an apparatus such as a mobile phone, or a module may be realized by executable code stored to a mobile phone or other device for execution upon invocation.

Thus, in view of the foregoing, it becomes clear that the present invention addresses several aspects of methods, element, entities and modules, which are for example as follows. In this regard, it is to be noted that denominations such as for example attachment and/or access apparatus are only intended to distinguish the different apparatuses defined, and not to limit the scope of the respective apparatuses in any way.

In summary, there is disclosed an attachment solution for multi-access environments. In particular, there are disclosed a standalone solution by way of a unified attachment node, an integrated solution by way of an intelligent access node, and an overall system solution by way of a unified attachment solution. The thus disclosed unified attachment solution may comprise a unified attachment node and an intelligent access node. Stated in other words, there is provided an evolution towards a unified attachment solution for any access in a multi-access environment.

Even though the invention is described above with reference to the examples according to the accompanying drawings, it is clear that the invention is not restricted thereto. Rather, it is apparent to those skilled in the art that the present invention can be modified in many ways without departing from the spirit and scope of the inventive idea as disclosed herein above and/or in the appended claims.

The invention as claimed is:

1. An apparatus, comprising:
 a first interface configured to receive requests to attach to a network operator, the requests originating from user equipment and being received in accordance with a plurality of different wireless access technologies comprising least a first type of wireless access technology and a second type of wireless access technology different from the first type of wireless access technology;
 a network attachment functionality component connected with the first interface and configured to provide a common point of network operator access authentication and authorization for the user equipment for each of the plurality of different wireless access technologies;
 a service authorization functionality component connected with the network attachment functionality component via a communication channel and configured to provide service authentication to a plurality of different types of services for user equipment granted access authentication and authorization by the network attachment functionality component; and
 a second interface connected with the service authorization functionality component and configured to connect with a plurality of service application servers, said second interface further configured to receive a request from a particular service application server for access information, that is specific to the particular service application server, for a user equipment that has been authenticated to use the particular service application server, and to respond to the request with the access-specific information obtained by said service authorization functionality component, via said communication channel, from said network attachment functionality component.

2. The apparatus of claim 1, further comprising: at least one of a session engine, a session database, a dynamic configuration server, and an authentication and authorization client.

3. The apparatus of claim 1, further comprising:
 a multiple access authentication functionality component.

4. The apparatus of claim 1, further comprising:
 a bootstrapping server functionality component of a generic authentication architecture type.

5. The apparatus of claim 1, wherein the apparatus comprises a unified attachment node.

6. The apparatus of claim 1, being configured to be operated in a multi-access environment.

7. The apparatus of claim 1, further comprising a support node functionality component.

8. The apparatus of claim 7, where the support node functionality component is comprised of a serving general packet radio service support node functionality component.

9. The apparatus of claim 1, where said service authorization functionality component comprises a dynamic home subscriber system entity.

10. The apparatus of claim 9, where said dynamic home subscriber system entity comprises a session control layer, and interconnected with said session control layer, register front ends and a subscriber data repository function, where said dynamic home subscriber system entity is configured to function as a single point of contact, a single point of management and a single point of authentication for the user equipment.

11. The apparatus of claim 1, where said first interface and said second interface comprise at least one of an interface with the user equipment for authentication, authorization and configuration; an interface with a network gateway to initialize and remotely configure the network gateway; an interface with a resource admission control subsystem to transfer user network profile and network location information; an interface with a service control subsystem and application plane to provide information about a user location; and an interface with an information system, customer care and supervision network of the network operator.

12. The apparatus of claim 1, where said service authorization functionality component comprises a generic authentication architecture bootstrapping server function, and where said first interface is comprised of a Ua interface and said second interface is comprised of a Zn interface.

13. The apparatus of claim 12, where said generic authentication architecture bootstrapping server function authenticates the user equipment based on information from a subscriber identification module of the user equipment that is received over the Ua interface, and provides a key used to authenticate the user equipment to a service application server, and where said service authorization functionality component provides the access-specific information as part of a key validation process over the Zn interface.

14. The apparatus of claim 12, further comprising a Zh interface connected to a home location register/home subscriber system.

15. The apparatus of claim 1, further comprising a mobility management entity function.

16. The apparatus of claim 1, where said network attachment functionality component comprises an authentication, authorization and accounting function and a serving gateway support node function.

17. A method, comprising:
 receiving attachment requests, via a first interface, to attach to a network operator, the attachment requests originating from user equipment and being received in accordance with a plurality of different wireless access technologies comprising least a first type of wireless access technology and a second type of wireless access technology different from the first type of wireless access technology;

operating a network attachment functionality component that is connected with the first interface to provide a common point of network operator access authentication and authorization for the user equipment for each of the plurality of different wireless access technologies;

operating a service authorization functionality component that is connected with the network attachment functionality component via a communication channel to provide service authentication to a plurality of different types of services for user equipment granted access authentication by the network attachment functionality component;

receiving access-specific requests from a plurality of service application servers via a second interface that is connected with the service authorization functionality component, where an access-specific request from a particular service application server is for a user equipment that has been authenticated to use the particular service application server; and responding to the access-specific request with access-specific information for the authenticated user equipment that is obtained by said service authorization functionality component, via said communication channel, from said network attachment functionality component.

18. The method of claim 17, where the steps of receiving attachment requests, operating the network attachment functionality component, operating the service authorization functionality component, receiving the access-specific requests and responding to the access-specific requests are all performed at single network operator node.

19. An apparatus, comprising:

a processor; and a memory including computer program code, where the memory and computer program code are configured to, with the processor, cause the apparatus at least to, receive attachment requests, via a first interface, to attach to a network operator, the attachment requests originating from user equipment and being received in accordance with a plurality of different wireless access technologies comprising least a first type of wireless access technology and a second type of wireless access technology different from the first type of wireless access technology;

operate a network attachment functionality component that is connected with the first interface to provide a common point of network operator access authentication and authorization for the user equipment for each of the plurality of different wireless access technologies;

operate a service authorization functionality component that is connected with the network attachment functionality component via a communication channel to provide service authentication to a plurality of different types of services for user equipment granted access authentication by the network attachment functionality component;

receive access-specific requests from a plurality of service application servers via a second interface that is connected with the service authorization functionality component, where an access-specific request from a particular service application server is for a user equipment that has been authenticated to use the particular service application server; and respond to the access-specific request with access-specific information for the authenticated user equipment that is obtained by said service authorization functionality component, via said communication channel, from said network attachment functionality component.

20. The apparatus of claim 19, further comprising a support node functionality component comprised of a serving general packet radio service support node functionality component.

21. The apparatus of claim 19, where said service authorization functionality component comprises a dynamic home subscriber system entity that comprises a session control layer, and interconnected with said session control layer, register front ends and a subscriber data repository function, where said dynamic home subscriber system entity is configured to function as a single point of contact, a single point of management and a single point of authentication for the user equipment.

22. The apparatus of claim 19, where said first interface and said second interface comprise at least one of an interface with the user equipment for authentication, authorization and configuration; an interface with a network gateway to initialize and remotely configure the network gateway; an interface with a resource admission control subsystem to transfer user network profile and network location information; an interface with a service control subsystem and application plane to provide information about a user location; and an interface with an information system, customer care and supervision network of the network operator.

23. The apparatus of claim 19, where said service authorization functionality component comprises a generic authentication architecture bootstrapping server function, and where said first interface is comprised of a Ua interface and said second interface is comprised of a Zn interface, where said generic authentication architecture bootstrapping server function authenticates the user equipment based on information from a subscriber identification module of the user equipment that is received over the Ua interface, and provides a key used to authenticate the user equipment to a service application server, and where said service authorization functionality component provides the access-specific information as part of a key validation process over the Zn interface, and further comprising a Zh interface connected to a home location register/home subscriber system.

24. The apparatus of claim 19, further comprising a mobility management entity function.

25. The apparatus of claim 19, where the access-specific information is comprised of user terminal location information.

* * * * *